(12) United States Patent
Andrade Ramos Propeck et al.

(10) Patent No.: US 8,744,932 B2
(45) Date of Patent: Jun. 3, 2014

(54) CUSTODIAL INVENTORY PROCESS OPTIMIZATION

(75) Inventors: Fernanda Andrade Ramos Propeck, Charlotte, NC (US); Justin Reed John Morgan Lehmann, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 117 days.

(21) Appl. No.: 13/570,824

(22) Filed: Aug. 9, 2012

(65) Prior Publication Data
US 2014/0046813 A1    Feb. 13, 2014

(51) Int. Cl.
G06Q 40/02    (2012.01)

(52) U.S. Cl.
USPC ............... 705/30; 705/35; 382/135; 382/136; 382/137

(58) Field of Classification Search
CPC combination set(s) only.
See application file for complete search history.

(56) References Cited

U.S. PATENT DOCUMENTS

| | | | |
|---|---|---|---|
| 6,034,605 | A | 3/2000 | March |
| 6,493,683 | B1 | 12/2002 | David et al. |
| 8,175,942 | B2 | 5/2012 | Crist et al. |
| 2003/0018513 | A1 | 1/2003 | Hoffman et al. |
| 2007/0100750 | A1 | 5/2007 | Hartfield et al. |

OTHER PUBLICATIONS

"The Federal Reserve Bank Custodial Inventory Manual of Procedures" dated May 5, 2010.*

Federal Reserve Currency Recirculation Policy, Robert deV. Frierson, Federal Resister/vol. 71, No. 56/Thursday, Mar. 23, 2006/Notices, pp. 14694-14701.
Fiserve, Carreker is now Fiserve, http://www.carreker.fiserv.com, retrieved on Aug. 8, 2012, 1 page.
Federal Reserve Bank Services, Custodial Inventory Program, http://www.frbservcies.org/operations/currency/custodial_inventory_program.html., retrieved Aug. 8, 2012, 3 pages.
Cash Services Custodial Inventory Program, http:/www.frbservcies.org/operations/currency/custodial_inventory_program.html., retrieved Aug. 8, 2012, 2 pages.
Customer Implementaion Guide, The Federal Reserve Bank's Implementation Guide for the Custodial Inventory (CI) Program, http://www.frbservcies.org/operations/currency/custodial_inventory_program.html., retrieved Aug. 8, 2012, 7 pages.
Federal Reserve Bank Custodial Inventory Application Form and Agreement, revision May 5, 2010, http:/www.frbservcies.org/operations/currency/custodial_inventory_program.html., retrieved Aug. 8, 2012, 8 pages.

(Continued)

Primary Examiner — Luna Champagne
(74) Attorney, Agent, or Firm — Banner & Witcoff, Ltd.; Michael A. Springs

(57) ABSTRACT

Herein described is a computer based system, a computer-readable storage media, and a method for optimizing the amount of currency transferred to a custodial inventory vault of a depository institution. The currency comprises ten and twenty dollar bills. For example, the method comprises determining a first amount of ten and twenty dollar bills, subtracting a second amount corresponding to a minimum vault holding requirement from the first amount to yield a third amount. The third amount is transferred along with a predetermined fourth amount to the custodial inventory vault of the depository institution. The predetermined fourth amount may be chosen to minimize or obviate an occurrence of an ending cash balance of ten and twenty dollar bills being less than the second amount. The third and fourth amounts of ten and twenty dollars bills are held in the custodial inventory vault and provide a monetary benefit for the depository institution.

20 Claims, 5 Drawing Sheets

(56) References Cited

OTHER PUBLICATIONS

Federal Reserve Bank Custodial Inventory Manual of Procedures, May 5, 2010, http:/www.frbservcies.org/operations/currency/custodial_inventory_program.html., retrieved Aug. 8, 2012, 24 pages.

Exhibit 1, Custodial Inventory Vault Access Log, http:/www.frbservcies.org/operations/currency/custodial_13 inventory_program.html., retrieved Aug. 8, 2012, 1 page.

Exhibit 2, Daily Custodial Inventory Vault Balance Report, http:/www.frbservcies.org/operations/currency/custodial_inventory_program.html., retrieved Aug. 8, 2012, 1 page.

Exhibit 3, Daily Video Surveillance Review Log, CCTV Cameras, VCRS, or Digital Recording Equipment, http:/www.frbservcies.org/operations/currency/custodial_inventory_program.html., retrieved Aug. 8, 2012, 1 page.

Exhibit 4, Weekly Video Surveillance Review Log, CCTV Quality of Recordings and Fields of View, http:/www.frbservcies.org/operations/currency/custodial_inventory_program.html., retrieved Aug. 8, 2012, 1 page.

Exhibit 5, Monthly Unannounced Management Inventory, http:/www.frbservcies.org/operations/currency/custodial_inventory_program.html., retrieved Aug. 8, 2012, 1 page.

Exhibit 6, Monthly Unannounced Management Inventory with Management Designee, http:/www.frbservcies.org/operations/currency/custodial_inventory_program.html., retrieved Aug. 8, 2012, 1 page.

Exhibit 7, Annual Compliance Certification for Custodial Inventor (CI) Program, http:/www.frbservcies.org/operations/currency/custodial_inventory_program.html., retrieved Aug. 8, 2012, 1 page.

Exhibit 8, Signature List, Samples for CI Team Signatures/Initials, http:/www.frbservcies.org/operations/currency/custodial_inventory_program.html., retrieved Aug. 8, 2012, 1 page.

Exhibit 9, Custodial Inventory Program Compliance Form, http:/www.frbservcies.org/operations/currency/custodial_inventory_program.html., retrieved Aug. 8, 2012, 1 page.

Exhibit 10, Change Request to the Custodial Inventory Application Form and Agreement, http:/www.frbservcies.org/operations/currency/custodial_inventory_program.html., retrieved Aug. 8, 2012, 2 pages.

Exhibit 11, Prior On-Site DI Vault Holdings and Payments Template, http:/www.frbservcies.org/operations/currency/custodial_inventory_program.html., retrieved Aug. 8, 2012, 3 pages.

Exhibit 12, FLWeb User List, http:/www.frbservcies.org/operations/currency/custodial_inventory_program.html., retrieved Aug. 8, 2012, 1 page.

Exhibit 13, FLWeb Payments Corrections, http:/www.frbservcies.org/operations/currency/custodial_inventory_program.html., retrieved Aug. 8, 2012, 1 page.

Exhibit 14, FL Web Holdings Corrections, http:/www.frbservcies.org/operations/currency/custodial_inventory_program.html., retrieved Aug. 8, 2012, 1 page.

A Framework to Analyze Cash Supply Chains, Divakar, Rajamani, et al., Oct. 22, 2005, 19 pages.

* cited by examiner

| Snapshot | 4/13/2012 (Friday) |
|---|---|
| 900's vaults 10s and 20s | $AA,AAA,AAA |
| 865 vault 10s and 20s | $BB,BBB,BBB |
| Unverified 10s and 20s | $C,CCC,CCC |
| Total of 10s and 20s | $DD,DDD,DDD |
| Minimum Vault Holding Requirement | $HH,HHH,HHH |
| Additional cash that can be moved to CI (at snapshot) | $E,EEE,EEE |
| CI Ending Balance on 4/13/2012 | $F,FFF,FFF |
| Projected Benefits | $GGG |

FIGURE 3A

Ending Balance

| | 4/13/2012 |
|---|---|
| Ending Balance Verified 10s and 20s | $JJ,JJJ,JJJ |
| Ending Balance Unverified 10s and 20s | $KK,KKK,KKK |
| Total 10s and 20s | $LL,LLL,LLL |

FIGURE 3B

| Snapshot | 4/13/2012 (Friday) After additional cash |
|---|---|
| 900's vaults 10s and 20s | $AA,AAA,AAA |
| 865 vault 10s and 20s | $BB,BBB,BBB |
| Unverified 10s and 20s | $C,CCC,CCC |
| Total of 10s and 20s | $DD,DDD,DDD |
| Additional cash that can be moved to CI (at snapshot) | $NN,NNN,NNN |
| Minimum Vault Holding Requirement | $HH,HHH,HHH |
| Additional cash that can be moved to CI (based on EB) | $PP,PPP,PPP |
| CI Ending Balance on 4/13/2012 | $QQ,QQQ,QQQ |
| Projected Benefits | $RRR |

FIGURE 4A

| Day of week | Additional Cash |
|---|---|
| Monday | $SS,SSS,SSS |
| Tuesday | $TT,TTT,TTT |
| Wednesday | $UU,UUU,UUU |
| Thursday | $UU,UUU,UUU |
| Friday | $UU,UUU,UUU |

FIGURE 4B

CUSTODIAL INVENTORY PROCESS OPTIMIZATION

BACKGROUND

The Custodial Inventory Program is applicable only to $10 and $20 notes and provides depository institutions an incentive to hold such notes in their vaults to address customer demand and increase currency recirculation. A custodial inventory (CI) enables an institution to transfer currency to the Federal Reserve Bank's books while physically holding the currency within an institution's secured facility. Once an institution has established a custodial inventory facility, the local Federal Reserve Bank will monitor the daily deposits to and withdrawals from that inventory facility and will periodically perform site reviews to ensure compliance with the program requirement. The institution must agree to allow full access by Federal Reserve Banks, the Board of Governors, the Government Accountability Office and their agents for unannounced audits of any aspect of the Custodial Inventory operation. An established Custodial Inventory site must report its vault holdings and payments to its customers on a daily basis via an Internet-based accounting and inventory tracking system. Payments to customers are defined as payments by the Custodial Inventory site to the institution's cash customers, including commercial customers (change orders), correspondent banks and/or its branches, the institution's own branch network and/or the ATM network, but excluding deposits to the Federal Reserve.

On every business day, the amount of currency transferred into custodial inventory by the institution represents a cost savings to the institution because that amount of currency otherwise would have been required to be held by the institution or transported to the Federal Reserve Bank's facilities. Such shipments of currency to the Federal Reserve Bank's facilities incur transportation costs to the institution. Therefore, it is important to an institution to be able to utilize an institution's custodial inventory facility.

SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Aspects of the exemplary embodiments provide at least a system, a computer readable media, and a method for optimizing the amount of currency, corresponding to ten and twenty dollar bills (denominations of 10s and 20s), transferred into custodial inventory.

The various aspects of the exemplary embodiments are substantially shown in and/or described in connection with at least one of the following figures, as set forth more completely in the claims.

These and other advantages, aspects, and novel features of the present disclosure, as well as details of illustrated embodiments, thereof, will be more fully understood from the following description and drawings.

BRIEF DESCRIPTION OF THE DRAWINGS

Aspects of the disclosure may take physical form in certain parts and steps, embodiments of which will be described in detail in the following description and illustrated in the accompanying drawings that form a part hereof, wherein:

FIG. 3A is a table illustrating a snapshot of balances and the amount of currency corresponding to 10s and 20s that may be transferred to custodial inventory prior to the close of business for the Federal Reserve Bank in accordance with an exemplary embodiment.

FIG. 3B is a table illustrating the computation of an ending balance used in optimizing the transfer of additional currency corresponding to 10s and 20s into custodial inventory for a business day, in accordance with an exemplary embodiment.

FIG. 4A is a table illustrating a snapshot of balances and an optimal amount of additional cash corresponding to ten and twenty dollar bills (10s and 20s) that may be transferred to custodial inventory prior to the close of business for the Federal Reserve Bank in accordance with an exemplary embodiment.

FIG. 4B is a table illustrating the optimal amount of additional cash corresponding to ten and twenty dollar bills (10s and 20s) that may be transferred to the custodial inventory account based on the business day of the week, in accordance with an exemplary embodiment.

It will be apparent to one skilled in the art after review of the entirety disclosed that the steps illustrated in one or more of the figures listed above may be performed in other than the recited order, and that one or more steps illustrated in these figures may be optional.

DETAILED DESCRIPTION

Various aspects of the exemplary embodiments provide for the optimization of the amount of currency an institution transfers to its custodial inventory facility on a daily basis. When transferring currency into the custodial inventory facility, the amount that is transferred may occur at any time before the Federal Reserve Bank closes. Accounting entries for settlement of custodial inventory transactions may occur daily only on Federal Reserve Bank business days during CI operating hours (7:00 am to 4:00 pm local time of the servicing Reserve Bank). One or more employees of the institution may input the accounting entries by way of an Internet-based accounting and inventory tracking system. By way of using this tracking system on a daily basis, the Federal Reserve Bank is also able to determine and require that a depository institution meets its minimum currency holding requirement of ten and twenty dollar bills (10s and 20s or $10s and $20s). The Federal Reserve Bank monitors and enforces the institution's minimum 10s and 20s currency holding requirement. The Federal Reserve may monitor the depository institution's holdings, on a daily basis, to ensure that custodial inventory does not exceed a certain cap and does not fall below a certain minimum requirement. For example, the inventory tracking system may monitor that the minimum holdings in the CI vault do not fall below one times the average of $10s and $20s paid out to customers in a previous full business week. While adhering to the Federal Reserve Bank's requirement, the various aspects of the exemplary embodiments maximize the amount of currency held in the institution's custodial inventory (CI) thereby moving the amount out of the institution's books and reducing the costs related to holding and maintaining that currency. In addition, by increasing the amount of currency stored in the CI vault, the costs related to cross-shipping of the currency to another depository institution or shipping the currency to a local Federal Reserve Bank is minimized. A depository institution may comprise a bank or any financial institution.

Figure 1:
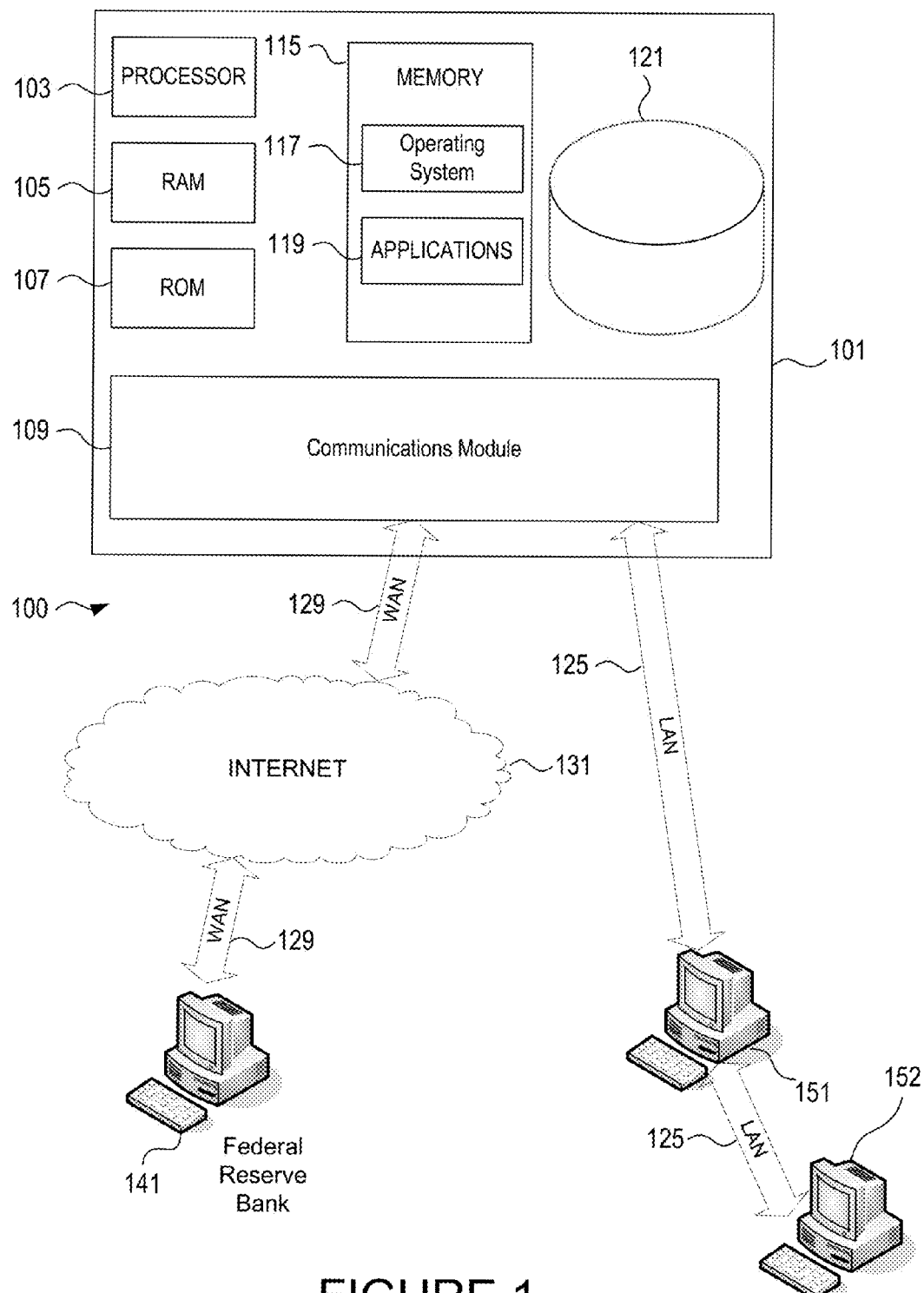
FIG. 1 is a block diagram of a suitable computing system environment 100 that may be used to optimize the amount of currency corresponding to ten and twenty dollar bills transferred to a custodial inventory facility of an institution, in accordance with an exemplary embodiment.

FIG. 1 is a block diagram of a suitable computing system environment 100 that may be used to optimize the amount of currency corresponding to ten and twenty dollar bills transferred to a custodial inventory facility of an institution, in accordance with an exemplary embodiment. The computing system environment 100 is only one example of a suitable computing environment and is not intended to suggest any limitation as to the scope of use or functionality contained in the disclosure. The computing system environment 100 should not be interpreted as having any dependency or requirement relating to any one or combination of components shown in the illustrative computing system environment 100. The computing system environment 100 comprises a computing system 101 and one or more computing devices 151, 152. Computing system 101 and one or more computing devices 151, 152 are communicatively coupled to a computing system 141 at the Federal Reserve Bank. The computing system 101 and the one or more computing devices 151, 152 may include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing system environment 100 includes a computing system 101 wherein the processes discussed herein may be implemented. The computing system 101 may comprise a server having a processor 103 for controlling overall operation of the computing system 101 and its associated components, including random-access memory (RAM) 105, read-only memory (ROM) 107, communications module 109, and memory 115. Processor 103 and its associated components may allow the computing system 101 to execute a series of computer-readable instructions related to performing a method for automatically optimizing the amount of currency transferred to a custodial inventory of an institution. One or more applications 119 may comprise the computer-readable instructions. The one or more applications 119 may be stored in the memory 115 and may be executed by the processor 103. Processor 103 may also direct computing system 101 to interact and communicate with computing devices 151, 152. The computing devices 151, 152 may comprise client devices for running one or more client applications under direction of the computing system 101. The one or more client applications may implement a process for optimizing the amount of currency transferred into and out of a custodial inventory (CI) account operated by the institution, for example. The computer-readable instructions may be executed by way of running one or more applications 119 that are resident in the computing system 101 and/or in one or more of the computing devices 151, 152. A user or operator of the computing system 101 and/or computing devices 151, 152 may provide input data and/or commands for running the one or more applications 119. The input data may be used by the processor to control the execution of the computer-executable instructions stored in memory 115. The input data may also be stored in memory 115 or in a data storage device 121. While FIG. 1 illustrates the one or more applications 119 as being resident in the memory 115, alternatively, the one or more applications 119 may also be resident within the data storage device 121 or within a memory or storage device of the computing devices 151, 152. The one or more applications 119 may implement an embodiment of the invention such as the exemplary process illustrated in connection with FIG. 3. The memory 115 and/or storage device 121 may comprise one or more drives, such as one or more portable hard disk drives, for example. The one or more applications 119 may be executed by the processor 103 to download and/or utilize the Federal Reserve Bank's Internet-based accounting and inventory tracking system. Computing system 101 and/or computing devices 151, 152 may also be configured by the one or more applications 119 to interface and communicate with an Internet-based accounting and inventory tracking system provided by a computing device 141 owned and operated by the Federal Reserve Bank. The computing system 101 and/or computing devices 151, 152 may be able to gain access to a website operated by the Federal Reserve Bank by way of using a web browser application 119. The website may contain a link to initiating the execution of the Federal Reserve Bank's Internet-based accounting and inventory tracking system.

The random access memory (RAM) 105 may store data used by the one or more applications while the computing system 101 is executing the computer-executable instructions by the processor 103. The read-only memory (ROM) 107 may store data which is regularly used by the operating system 117. The operating system may be stored in the memory 115.

Computing system 101 typically includes a variety of computer readable media. Computer readable media may be any available media that may be accessed by computing device 101 and include both volatile and nonvolatile media, removable and non-removable media. By way of example, and not limitation, the computer-readable media may comprise a combination of computer storage media and communication media. The memory 115 and/or data storage device 121 may comprise computer readable media. The computer readable media may comprise one or more hard disk drives, for example. The computing system 101 may be owned and/or operated by the organization. Computer readable media may be implemented in any method or technology for storage of information such as computer readable instructions, data structures, program modules, or other data. Computer readable media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store desired information that can be accessed by the computing system 101 or computing devices 141, 151, 152. The computer readable media may contain the one or more applications 119 used in the implementation of the operational flow diagram illustrated in FIG. 3.

Communications module 109 may include a microphone, keypad, touch screen, and/or stylus through which a user of computing system 101 may provide input, and may also include one or more speakers for providing audio output and a video display device for providing textual, audiovisual and/or graphical output.

Computing system 101 may operate in a networked environment supporting connections to one or more remote computing devices, such as computing devices 141, 151, 152. Each of the computing devices 141, 151, 152 may be local or remote servers or personal computers that include many or all of the elements described with regard to computing system 101. Each of the computing devices 141, 151, 152, may comprise any of the components resident in computing system 101. The computing devices 141, 151, 152 may comprise an applications server, for example.

The network connections depicted in FIG. 1 include local area networks (LANs) 125 and wide area networks (WANs) 129 but may also include any other types of networks. When used in a LAN networking environment, the computing system 101 may be connected to the LAN 125 through a network interface or adapter within the communications module 109 shown in FIG. 1. When used in a WAN networking environment, the computing system 101 may include a modem in the communications module 109 or other means for establishing communications over the WAN 129 by way of the Internet 131. It will be appreciated that the network connections shown are illustrative and other means of establishing a communications link between the computing devices may be used. Various well-known protocols such as TCP/IP, Ethernet, FTP, HTTP and the like may be used, and the computer system 101 may be operated in a client-server configuration.

The one or more application programs 119 used by the computing system 101, according to an illustrative embodiment, may include computer-executable instructions for invoking user functionality related to communications including, for example, email, short message service (SMS), downloading and using web based applications such as the Federal Reserve Bank's Internet-based accounting and inventory tracking system, and voice input and speech recognition applications (e.g., for transmitting data to and receiving data from the Federal Reserve Bank via an Internet-based accounting and inventory tracking system). In addition, the application programs 119 may include computer-executable instructions for invoking one or more of the functions, steps, and/or processes described in FIG. 3.

Although not required, various aspects of the invention, as described herein, may be embodied as a method, a computing system, or as a computer-readable media storing computer-executable instructions. For example, a computer-readable media may store instructions that, when executed by one or more processors, causes an apparatus or system to perform steps of a method or process in accordance with aspects of the disclosed embodiments. For example, aspects of the method steps disclosed herein may be executed on a processor 103 resident in the computing system 101. Such a processor may execute computer-executable instructions stored on a computer-readable media.

Figure 2:
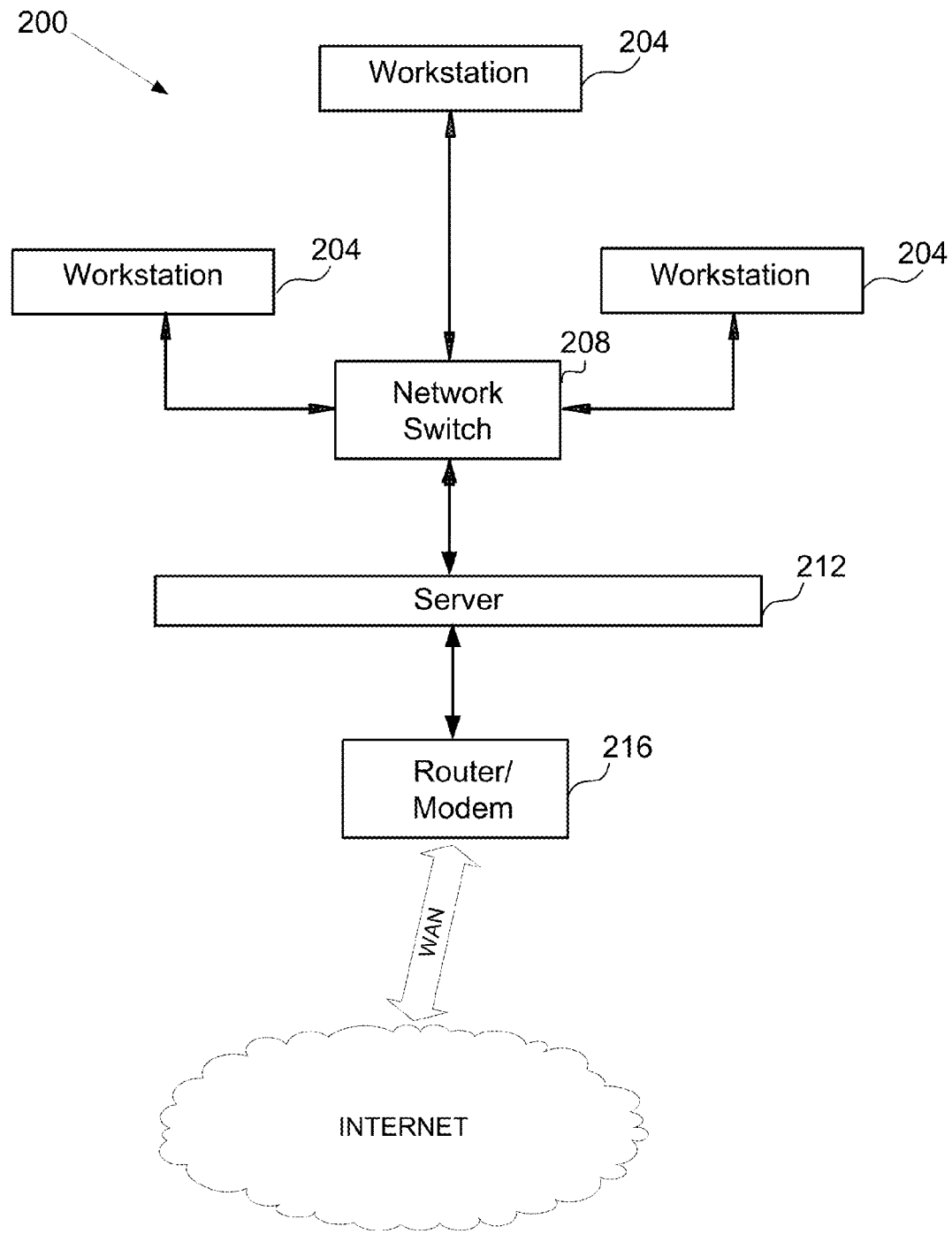
FIG. 2 is a block diagram of a system used by an institution for implementing a method for optimizing the amount of currency corresponding to ten and twenty dollar bills transferred into custodial inventory, in accordance with an exemplary embodiment.

FIG. 2 is a block diagram of a system used by an institution for implementing a method for optimizing the amount of currency corresponding to ten and twenty dollar bills transferred into custodial inventory, in accordance with an exemplary embodiment. The system comprises one or more workstations 204 communicatively coupled to a server 212 through a network switch 208. The network switch 208 may be used to direct data packets between the workstations 204 and the server 212. The system further comprises a router/modem 216 communicatively coupled to the server 212. The router/modem 216 facilitates access to the Internet such that the server 212 may be able to access and communicate with the Federal Reserve Bank's website which contains the Internet-based accounting and inventory tracking system. The server 212 may be similar to the computing system 101 previously illustrated and described in connection with FIG. 1. The workstations 204 may be similar to the computing devices 151, 152 previously illustrated and described in connection with FIG. 1. The workstations 204 may be local or remote. The server 212 may comprise one or more components such as a processor, memory, and data storage device. The processor may execute computer-executable instructions stored in the memory and/or data storage device. When executed by the processor, the computer-executable instructions may cause one or more steps of a method for optimizing the transfer of currency into a custodial inventory vault. The steps performed may comprise the steps described in connection with FIG. 3. The computer-executable instructions may be executed when one or more applications resident in the memory and/or data storage device are launched by a user. Each of the one or more workstations 204 may be operated by one or more users. The user may comprise one or more employees of the institution. The institution may comprise a bank or any other financial institution. The one or more workstations 204 may be used as one or more clients in a client-server type of configuration. Each of the workstations 204 may comprise a display, an input device such as a keyboard, and a mouse for making selections, for example. The display may be used to view the Federal Reserve Bank's website and access the Internet-based accounting and inventory tracking system. The server 212 may be used to process the inputs received from the one or more users of the workstations 204.

FIG. 3A is a table illustrating a snapshot of balances and the amount of currency corresponding to 10s and 20s that may be transferred to custodial inventory of a depository institution, prior to the close of business for the Federal Reserve Bank, in accordance with an exemplary embodiment. This exemplary snapshot occurs prior to the Federal Reserve Bank's close of business on Apr. 13, 2012 (Friday), for example. The numerical values associated with the snapshot correspond to an exemplary time of 3 PM at the depository institution. The depository institution may comprise any type of depository institution, such as a bank, located in any city. The first row of the table is associated with the amount of 10s and 20s (i.e., $10 dollar bills and $20 dollar bills) contained in 900's type vaults at 3 PM. The second row of the table is associated with 10s and 20s contained in 865 type vaults at 3 PM. The 10s and 20s in the vaults may comprise verified amounts. A verified balance is a value that is documented by denomination. The third row is associated with the total number of unverified 10s and 20s at 3 PM. An unverified balance is a value that is not documented by denomination. The fourth row corresponds to a total snapshot of both unverified and verified 10s and 20s (which is the sum of the amounts of the 10s and 20s in the previous rows). For example, the sum of the amounts, $AA,AAA,AAA, $BB,BBB,BBB, and $C,CCC,CCC equals the total value of the 10s and 20s at the time the snapshot is taken, $DD,DDD,DDD. The fifth row is associated with the minimum vault holding requirement amount ($HH,HHH,HHH) that the Federal Reserve Bank requires for a depository institution to be able to participate in the program. The minimum vault holdings requirement is determined by the Federal Reserve Bank and is the necessary amount of 10s and 20s that the depository institution must hold on a daily basis. The minimum vault holdings requirement is equal to one times the daily average of $10s and $20s paid out to customers in a previous full business week. The depository institution must also maintain a custodial inventory amount not to exceed the Inventory CAP. The Inventory CAP may be defined to be equal to a multiple of (e.g., four times) the daily average payments of $10s and $20s paid out to customers over a period of time (e.g., in the previous full business week). The table also indicates the amount of 10s and 20s that can be moved to custodial inventory (CI). The amount of 10s and 20s is computed by subtracting the minimum vault holding requirement from the total snapshot of 10s and 20s. While the difference equals $e,eee,eee, the amount of currency corresponding to 10s and 20s transferred into custodial inventory (CI) is $E,EEE,EEE, because the amount transferred, in this example, is required to be in multiples of twenty thousand dollar bundles. Therefore, in this embodiment, $E,EEE,EEE is transferred to the custodial inventory vault at the institution, at 3 PM, prior to closure of the Federal Reserve Bank. The balance in custodial inventory after $E,EEE,EEE gets deposited is $F,FFF,FFF. The amount of 10s and 20s to be transferred to custodial inventory is determined at a snapshot time of 3 PM, for example, prior to the close of the Federal Reserve Bank to comply with the Federal Reserve Bank's daily reporting requirement. The Federal Reserve Bank requires that daily custodial inventory reporting be entered into its Internet-based accounting and inventory tracking system by a certain time (e.g., 4 PM). Since the depository institution is still in operation past 4 PM, additional deposits from customers may be received after reporting has been completed. Therefore, the total amount of 10s and 20s may increase during the period after reporting has been completed but before the depository institution closes. As a consequence, additional 10s and 20s cash may be available for transfer into the depository institution's custodial inventory vault.

A reduction of costs may be considered a benefit of participating in the custodial inventory program. The benefit may be associated with the transfer of currency holding costs from the depository institution to the Federal Reserve Bank. The benefit is realized when additional cash (in twenty thousand dollar bundles of 10s and 20s, for example) is transferred onto the Federal Reserve Bank's books by way of participating in the custodial inventory program. A benefit may also be realized if one considers a reduction of the cost involved in transporting the additional cash to the closest local Federal Reserve Bank from the depository institution if the depository institution is unable to store the additional cash at a custodial inventory (CI) vault of the depository institution. The benefit of participating in the custodial inventory program may be computed using an annual rate of return of the amount of 10s and 20s held in the custodial inventory vault. In an illustrative embodiment, the computation of the benefit may only apply to business days (i.e., weekdays). In another illustrative embodiment, the benefit comprises a reduction in the cost of holding (and/or managing) the additional cash (i.e., holding costs) during weekdays. Given the benefit expressed as an annual percentage rate of YY.YY % for calendar year 2012, the monetary benefit to the depository institution may be computed to be $GGG for Friday, Apr. 13, 2012, as shown in the eighth row of the snapshot table in FIG. 3A. Of course, the benefit rate may vary based on any other additional costs associated with not being able to transfer the additional cash to the Federal Reserve Bank's books by way of using the depository institution's custodial inventory (CI) vault. For example, the benefit rate may comprise any percentage rate (such as 0.5%, 0.75%, 0.78%, 0.96%, 1.0%, 1.29%, 1.33%, or any other rate per annum) associated with the reduction of holding costs and/or other costs corresponding to the amount of 10s and 20s held in the custodial vault.

FIG. 3B is a table illustrating the computation of an ending balance used in optimizing the transfer of additional currency corresponding to 10s and 20s into custodial inventory in a business day, in accordance with an exemplary embodiment. The ending balance presents numerical balances at the end of the business day. The ending balances may be determined right before the depository institution closes (e.g., right before 5 PM, for example). FIG. 3B provides a table of exemplary ending balances for an exemplary business day, Apr. 13, 2012 (Friday). The first row lists the ending balance of verified 10s and 20s ($10 bills and $20 bills). In this exemplary table, the ending balance of verified 10s and 20s equals $JJ,JJJ,JJJ. In the second row of the table, the ending balance of unverified 10s and 20s equals $KK,KKK,KKK. The third line provides a sum of the verified and unverified 10s and 20s which equals $LL,LLL,LLL in this instance. This corresponds to the ending balance of 10s and 20s for the depository institution (i.e., of both verified and unverified 10s and 20s) at the end of the business day.

By comparing the total 10s and 20s in the ending balance table ($LL,LLL,LLL) with the total of 10s and 20s as indicated in the snapshot table ($DD,DDD,DDD), there is additional 10s and 20s cash at the end of the business day (based on the total of both verified and unverified cash ending balances) for the depository institution which could have been transferred into the custodial inventory vault. The difference is $LL,LLL,LLL−DD,DDD,DDD=$MM,MMM,MMM. This represents additional cash above and beyond the minimum vault holding requirement that could have been deposited into the custodial inventory vault.

FIG. 4A is a table illustrating a snapshot of balances and an optimal amount of additional cash corresponding to ten and twenty dollar bills (10s and 20s) that may be transferred to custodial inventory prior to the close of business for the Federal Reserve Bank in accordance with an exemplary embodiment. The table presents a snapshot for Apr. 13, 2012 (Friday). In this exemplary situation, the optimal amount of additional cash transferred to custodial inventory is $NN,NNN,NNN (as circled in the fifth row of the table). In addition to the $E,EEE,EEE (as previously shown in FIG. 3A), there is an additional $NN,NNN,NNN that is transferred to the custodial inventory vault. Therefore, the total amount transferred to custodial inventory is $PP,PPP,PPP, as indicated in the seventh row of the table, which is based on the ending balance of both verified and unverified 10s and 20s. As was previously determined based on using the values in the exemplary tables of FIGS. 3A and 3B, the ending balance of both verified and unverified 10s and 20s equals $LL,LLL,LLL. The total amount of cash available for transfer to the custodial inventory vault at the end of the day for the depository institution was $LL,LLL,LLL−$HH,HHH,HHH (Ending Balance of 10s and 20s for the depository institution minus the minimum vault holding requirement). Therefore, based on the additional cash available at the end of the business day, Apr. 13, 2012 (Friday), an additional $NN,NNN,NNN transferred prior to the closure of the Federal Reserve Bank does not exceed $LL,LLL,LLL−$HH,HHH,HHH, and may be considered to be an optimal amount that could have been transferred at 3 PM, before the Federal Reserve Bank closes. The custodial inventory ending balance on Apr. 13, 2012 is $QQ,QQQ,QQQ after the additional cash of $NN,NNN,NNN is added to the custodial inventory vault. Hence, with more cash transferred to the custodial inventory vault, the benefit to the depository institution may be expressed as $RRR using YY.YY % as the benefit rate per annum.

The optimal amount of cash transferred into the custodial inventory vault may be determined based on historical data. The optimal amount may be based on the expected or forecasted value for the difference between the ending balance of 10s and 20s (Total 10s and 20s, as indicated in the last row of the table of 3B) and—the minimum vault holding requirement. The expected or forecasted value for this difference may be monitored on a daily basis over any number of days. For example, a statistical average of this forecasted value may be obtained by computing an average value of this difference over a period of one year. The forecasted value of the difference may be computed for each business day of the week (i.e., Monday through Friday excluding holidays).

FIG. 4B is a table illustrating the optimal amount of additional cash corresponding to ten and twenty dollar bills (10s and 20s) that may be transferred to the custodial inventory account based on the business day of the week, in accordance with an exemplary embodiment. In an illustrative embodiment, the values in the table comprise optimal amounts which have been determined using historical data and statistical analysis. The optimal amount of additional cash to be transferred into the custodial inventory vault may be determined by way of computing the average and standard deviation of historical values for the difference between an ending balance of 10s and 20s (around 9 PM, corresponding to the time of closing for the depository institution) and the minimum vault holding requirement. The difference may be determined for a certain business day of a week. Thus, the values for one or more differences may be determined using one or more weeks of historical data. For example, values for the difference (amount of additional 10s and 20s cash to be transferred into the custodial inventory vault) for each Friday over the last 52 weeks (i.e., one year) may be obtained. After the 52 values have been determined, an average of the 52 values may be computed. The historical average can also be computed for each of Monday, Tuesday, Wednesday, and Thursday as well. Furthermore, a sufficient amount of historical data may be obtained over any period of time such that the data points may fit a distribution. A standard deviation may be computed to determine a confidence level of the mean or median. The amount of additional cash corresponding to ten and twenty dollar bills (10s and 20s) that may be transferred to the custodial inventory account for a certain business day may be determined based on using the mean, and/or standard deviation. Thus, the amount of additional cash corresponding to ten and twenty dollar bills (10s and 20s) that may be transferred to the custodial inventory account may be determined based on past experience. The optimal amount of additional cash corresponding to ten and twenty dollar bills to be transferred into the custodial inventory vault may be chosen for each business day of the week. The optimal amounts for each business day may be chosen so that the probability is as close to 100% that the ending balance for each business day is greater than or equal to the minimum vault holding requirement. The optimal amount may be chosen to minimize or obviate an occurrence of an ending cash balance of all ten and twenty dollar bills of the institution to be less than the minimum vault holding requirement of the institution. The optimal amount or optimal value of 10s and 20s for transfer to the CI vault on Mondays may be larger than any other business day of the week, at $SS,SSS,SSS, because it is contemplated that retail businesses sell more products and/or services over the weekend and may wish to deposit the cash they earned over the weekend on the first business day of the week, Monday. The optimal amount of 10s and 20s for transfer to the CI vault on Tuesdays may be next largest, at $TT,TTT,TTT, for example, while the optimal amount of 10s and 20s for transfer to the CI vault on each of Wednesday, Thursday, and Friday may be $UU,UUU,UUU (where $SS,SSS,SSS>$TT,TTT,TTT>$UU,UUU,UUU).

Figure 5:
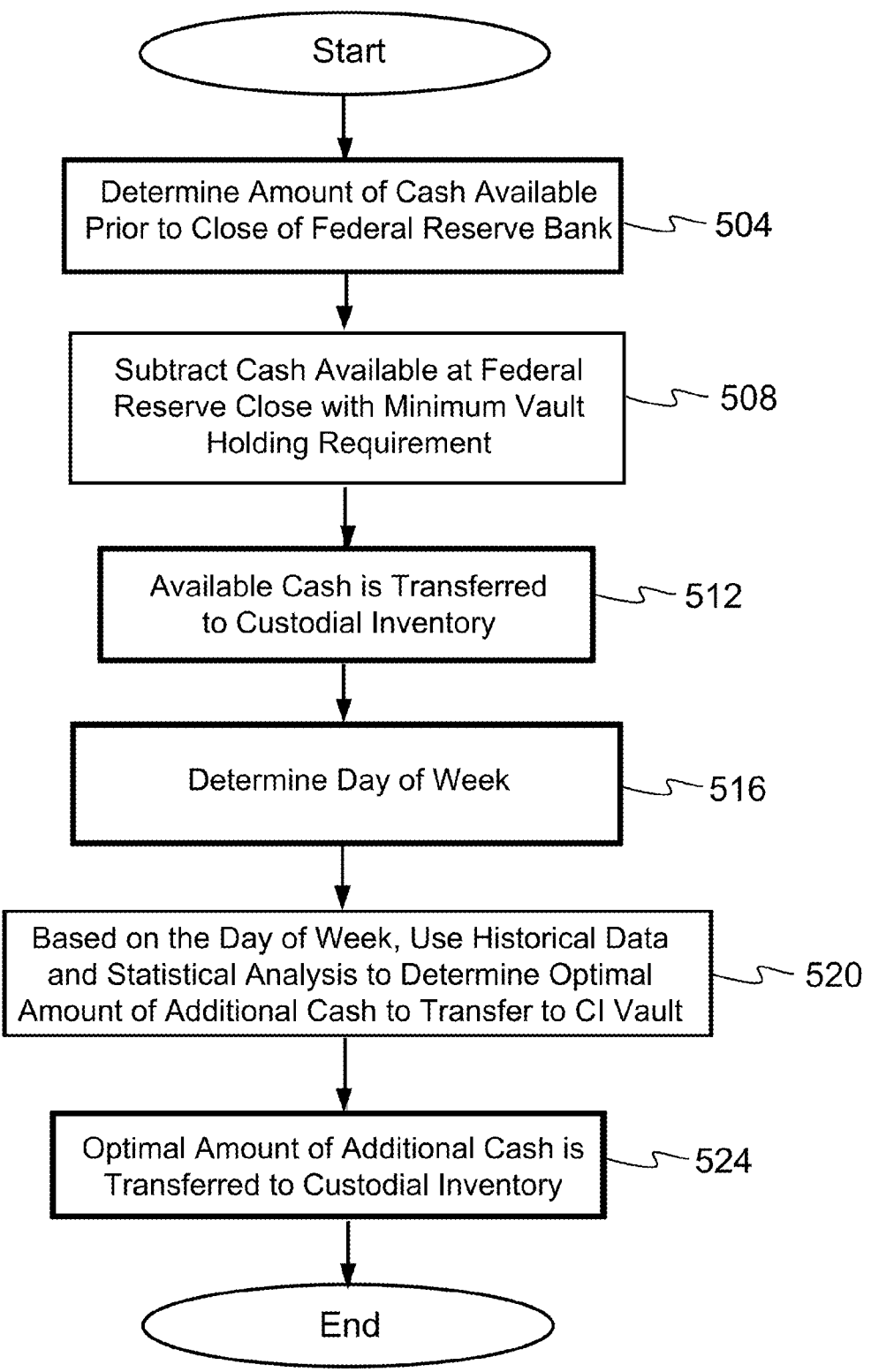
FIG. 5 is an operational flow diagram describing a method for optimizing the transfer of currency into custodial inventory, in accordance with an exemplary embodiment.

FIG. 5 is an operational flow diagram describing a method for optimizing the transfer of currency into custodial inventory, in accordance with an exemplary embodiment. The method or process described in the operational flow diagram may be implemented by a depository institution using one or more of the computing system, computing devices, server, and/or workstations, as described in connection with FIGS. 1 and/or 2. The methods or processes may be performed by one or more processors resident in the one or more of the computing system, computing devices, server, and/or workstations. Such one or more processors may execute computer-executable instructions stored on a computer-readable medium to implement the processes and/or methods described herein.

At step 504, prior to the close of the Federal Reserve Bank, the amount of 10s and 20s available for transfer into the custodial inventory of the depository institution is determined. The 10s and 20s correspond to both verified and unverified bills. In one example, one or more processing systems and/or devices, such as the computing system, computing devices, server, and/or workstations may receive inputs from personnel at the depository institution regarding this amount. The computing system, computing devices, server, and/or workstations may provide alerts to one or more personnel of the depository institution that certain inputs may need to be received. These inputs may be received from one or more of the computing devices and/or workstations during the day while transactions were being performed by personnel such as tellers, clerks, and any other personnel of the depository institution. The transactions may comprise any type of deposits, withdrawals, or money transfers, and the like, related to ten and twenty dollar bills, for example. The transaction data may be automatically transmitted to a processing device, such as the server, for example, where the server automatically and continuously monitors and keeps track of the available amount of 10s and 20s the depository institution holds at any time throughout the business day. In another example, one or more of the processing systems and/or devices may automatically detect the amount of bills of ten and twenty denominations the depository institution is disbursing/receiving throughout the day without requiring manual input from personnel at the depository institution. Such information may be used in determining the amount of currency corresponding to all ten and twenty dollar bills held by an institution at a time of a business day.

Next, at step 508, the amount of 10s and 20s available for transfer into the custodial inventory vault may be determined by the one or more computing system, computing devices, server, and/or workstations by way of subtracting the minimum vault holding requirement from the total amount of all 10s and 20s (i.e., currency value of all 10s and 20s). The amount of cash available for transfer to the CI vault is computed by subtracting the minimum vault holding requirement from the total amount of all 10s and 20s at the snapshot time (e.g., at 3 PM). This determination is made with enough time to physically transfer the 10s and 20s to the CI vault and report the transfer using a Federal Reserve Bank's Internet based inventory management tracking application. The procedures instituted by the Federal Reserve Bank may require that the transaction be reported within a certain time after the 10s and 20s are physically transferred into the CI vault. For example the Federal Reserve Bank may require that the 10s and 20s are transferred within 15 minutes of the physical transfer. The reporting may be performed using the one or more of the computing system, computing devices, server, and/or workstations described in connection with FIG. 1 or 2 in conjunction with the Federal Reserve Bank's Internet-based accounting and inventory tracking system. The reporting may have to be performed by the personnel who transferred the cash to the CI vault. This reporting may occur at approximately 3 PM every business day during custodial inventory (CI) operating hours, for example. The reporting is done prior to the daily close of the Internet-based accounting and inventory tracking system. In an illustrative embodiment, the operating hours for receiving CI vault transactions using the Internet-based accounting and inventory tracking system are from 7 AM to 4 PM during business days.

Next, at step 512, the available cash of 10s and 20s is transferred into custodial inventory. The one or more computing system, computing devices, server, and/or workstations may need to report any transfer activity occurring between the depository institution and the custodial inventory vault within a certain period of time after the physical transaction occurs. The reporting may occur at step 524 when the total amount of 10s and 20s transferred to the CI vault. The computing system, computing devices, server, and/or workstations may be configured to report any transaction to the Internet-based accounting and inventory tracking system. The reporting may occur based on one or more inputs received from the one or more personnel who transferred the cash to the CI vault.

Next, the process proceeds at step 516, where the business day of the week is automatically determined by the time provided by the computing system, computing devices, server, and/or workstations. The business day of the week may be received by the computing system, computing devices, server, and/or workstations from input provided by a user.

Based on the business day, at step 520, the computing system, computing devices, server, and/or workstations may automatically look up an optimal amount (or value) of additional cash (corresponding to a number of ten and a number of twenty dollar bills), to be transferred to the CI vault. For example, historical data for the depository institution's total amount of 10s and 20s at the end of its business day (e.g., 9 PM) may be obtained for each Friday for the last year (previous 52 Fridays). Likewise, historical data may be obtained for the depository institution's total amount of 10s and 20s at a snapshot time (i.e., 3 PM or a specified time prior to the close (e.g., 4 PM) of CI transaction processing for the day as determined by the operating hours of an Internet-based accounting and inventory tracking system.) By subtracting the minimum vault holding requirement of 10s and 20s from the total ending balance amount, a maximum additional amount of cash to be deposited or transferred to the CI vault may be determined historically for each of the past 52 Fridays. The maximum additional amount of cash to be transferred to the CI vault may be determined using historical data for each business day of the week (i.e., Monday-Friday). After reviewing the historical data and computing the maximum additional amount for each Friday of the last 52 weeks, the optimal amount (or value) of additional cash of 10s and 20s may be chosen to be the smallest (or close to the smallest) of the 52 maximum additional amounts, in order to insure that the total amount (or value) of 10s and 20s transferred to the CI vault does not cause the amount (or value) of 10s and 20s held by the institution to fall below the minimum vault holding requirement. In an illustrative embodiment, the ratio of number of 10s to the number of 20s transferred to the CI vault may be specified by the Federal Reserve Bank.

At step 524, the optimal amount of additional cash of 10s and 20s to be transferred to the CI vault may be chosen, using historical data, to account for unexpected variations over time. In an illustrative embodiment, the optimal amount of additional cash of 10s and 20s may be transferred into custodial inventory at the same time the available cash of 10s and 20s are transferred into the custodial inventory. Therefore, steps 508, 512, 516, 524 may be performed at approximately the same time and prior to the close of the business day for the Federal Reserve Bank. The total amount of 10s and 20s is transferred prior to the close of business because the total amount of 10s and 20s transferred to the CI vault must be reported prior to closure of the Federal Reserve Bank. The optimal amounts of additional 10s and 20s to transfer to the CI vault may be chosen based on a statistical analysis of the historical data. As previously described, the historical data may include the ending balances of 10s and 20s of the depository institution for a particular business day over a plurality of weeks in the past. The statistical analysis may be based on the mean and standard deviation of the maximum additional amount of cash to be deposited or transferred to the CI vault at the end of the institution's business day, for example. The maximum additional amount of cash may vary depending on the day of the week. Therefore, the optimal amount of additional cash to be transferred to the CI vault may vary based on day of the week as was previously described in connection with FIG. 4B. Of course, the historical data used in determining the optimal amount of additional cash to transfer to the CI vault, per day of the week, may span more than one year and may in certain embodiments include many years of historical data.

It is contemplated that the maximum additional amount of cash and optimal amount of additional cash for deposit to a CI vault on a business day will increase as the total revenue of an institution's customers increases. As a consequence, the time span and/or time periods for which the historical data is obtained and used in the statistical analysis may need to be re-adjusted to fit the revenues generated by the current customer base. If used, the statistical analysis may need to be re-evaluated and performed periodically resulting in revised values for the optimal amount (or optimal value) of 10s and 20s for transfer to the CI vault for each business day of the week. Furthermore, for example, changes in the number of customers, type of business of its customers, the deposit amounts made by the customers, and the total amount of deposits made at the institution in relation to the day of the week, may trigger the depository institution to re-evaluate and recalculate the optimal amount of additional 10s and 20s cash transferred to the CI vault per each business day of the week.

The foregoing presents a simplified summary of the disclosure in order to provide a basic understanding of some aspects. It is not intended to identify key or critical elements of the invention or to delineate the scope of the invention. Although not required, one of ordinary skill in the art will appreciate that the various aspects described herein may be embodied as a method, a data processing system, or as a computer-readable medium for storing computer-executable instructions that are capable of being executed by a processor of a computer system. Accordingly, those aspects may take the form of an entirely hardware embodiment, an entirely software embodiment or an embodiment combining software and hardware aspects. For example, a tangible computer-readable storage media (e.g., a CD-ROM, RAM, hard drive, flash memory, and the like) that stores instructions to cause a processor to perform methods in accordance with aspects of the disclosure is contemplated.

Aspects of the invention have been described in terms of illustrative embodiments thereof. Numerous other embodiments, modifications, and variations within the scope and spirit of the disclosed invention will occur to persons of ordinary skill in the art from a review of this entire disclosure. For example, one of ordinary skill in the art will appreciate that the steps illustrated in the illustrative figures may be performed in other than the recited order, and that one or more steps illustrated may be optional in accordance with aspects of the disclosure.

While some embodiments have been described with respect to specific examples, other embodiments include numerous variations and permutations of the above described systems and techniques.

We claim:

1. A computer based system comprising:
   at least one processor; and
   at least one memory storing computer executable instructions, wherein execution of said computer executable instructions by said processor causes the system to at least perform:
   first determining a first amount of currency corresponding to all ten and twenty dollar bills held by an institution at a time of a business day, wherein a processing device of said computer based system continuously monitors and tracks transactions related to said ten and twenty dollars bills throughout said business day;
   subtracting a second amount of currency, corresponding to a minimum vault holding requirement of said ten and twenty dollar bills, from said first amount to yield a third amount for transfer to a custodial inventory vault of said institution at said time of said business day; and
   second determining a predetermined fourth amount of currency for transfer to said custodial inventory vault at said time of said business day, wherein said predetermined fourth amount is chosen to minimize an occurrence of an ending cash balance of all ten and twenty dollar bills of said institution to be less than said second amount, and wherein a total amount transferred to said custodial inventory vault for said business day equals a sum of said third amount and said fourth amount.

2. The computer based system of claim 1 wherein execution of said computer executable instructions further causes said computer based system to at least perform:
   reporting a transfer of said total amount into said custodial inventory vault after said transfer is completed.

3. The computer based system of claim 2 wherein said time of said business day is prior to the close of business of the Federal Reserve Bank and wherein said reporting is performed prior to the close of business of the Federal Reserve Bank.

4. The computer based system of claim 1 wherein said predetermined fourth amount is based on a statistical analysis of a plurality of historical ending cash balances of said ten and twenty dollar bills of said institution, wherein each of said plurality of historical ending cash balances corresponds to a day of a week of one or more weeks, said day corresponding to said business day.

5. The computer based system of claim 2 wherein said reporting is conducted using an on-line inventory tracking and accounting system.

6. The computer based system of claim 1 wherein said predetermined fourth amount is determined by way of performing a statistical analysis of one or more differences, and wherein each of said one or more differences is computed by subtracting said minimum vault holding requirement from each of one or more historical ending balances of ten and twenty dollar bills of said institution of said business day, wherein each of said one or more historical ending balances corresponds to a day of a week of a plurality of weeks, said day corresponding to said business day.

7. The computer based system of claim 1 wherein execution of said computer executable instructions further causes said computer based system to at least perform:
   third determining a monetary benefit for said institution based on multiplying said total amount transferred by a benefit rate, wherein said benefit rate is based on holding costs of said ten and twenty dollar bills.

8. A non-transitory computer-readable storage media having stored thereon, a computer program having at least one code section for processing data, said at least one code section being executable by a processor of a computer for causing said computer to perform at least:
   first determining a first amount of currency corresponding to all ten and twenty dollar bills held by an institution at a time of a business day;
   subtracting a second amount of currency, corresponding to a minimum vault holding requirement of said ten and twenty dollar bills, from said first amount to yield a third amount for transfer to a custodial inventory vault of said institution at said time of said business day; and
   second determining a predetermined fourth amount of currency for transfer to said custodial inventory vault at said time of said business day, wherein said predetermined fourth amount is chosen to minimize an occurrence of an ending cash balance of all ten and twenty dollar bills of said institution to be less than said second amount, and wherein a total amount transferred to said custodial inventory vault for said business day equals a sum of said third amount and said fourth amount.

9. The non-transitory computer-readable storage media of claim 8 wherein said at least one code section further causes the computer to perform at least:
   reporting a transfer of said total amount into said custodial inventory vault after said transfer is completed.

10. The non-transitory computer-readable storage media of claim 9 wherein said time of said business day is prior to the close of business of the Federal Reserve Bank and wherein said reporting is performed prior to the close of business of the Federal Reserve Bank.

11. The non-transitory computer-readable storage media of claim 8 wherein said predetermined fourth amount is based on a statistical analysis of a plurality of historical ending cash balances of said ten and twenty dollar bills of said institution, wherein each of said plurality of historical ending cash balances corresponds to a day of a week of one or more weeks, said day corresponding to said business day.

12. The non-transitory computer-readable storage media of claim 9 wherein said reporting is conducted using an on-line inventory tracking and accounting system, and wherein at least a part of the first amount of currency is determined using a processing device configured to automatically detect the amount of ten and twenty dollar bills the depository institution is disbursing throughout the day.

13. The non-transitory computer-readable storage media of claim 8 wherein said predetermined fourth amount is determined by way of performing a statistical analysis of one or more differences, and wherein each of said one or more differences is computed by subtracting said minimum vault holding requirement from each of one or more historical ending balances of ten and twenty dollar bills of said institution of said business day, wherein each of said one or more historical ending balances corresponds to a day of a week of a plurality of weeks, said day corresponding to said business day.

14. The non-transitory computer-readable storage media of claim 8 wherein said at least one code section further causes the computer to perform at least:

third determining a monetary benefit for said institution based on multiplying said total amount transferred by a benefit rate, wherein said benefit rate is based on holding costs of said ten and twenty dollar bills.

15. A method comprising:

first determining a first amount of currency corresponding to all ten and twenty dollar bills held by an institution at a time of a business day;

subtracting a second amount of currency, corresponding to a minimum vault holding requirement of said ten and twenty dollar bills, from said first amount to yield a third amount for transfer to a custodial inventory vault of said institution at said time of said business day; and second determining a predetermined fourth amount of currency for transfer to said custodial inventory vault at said time of said business day, wherein said predetermined fourth amount is chosen to minimize an occurrence of an ending cash balance of all ten and twenty dollar bills of said institution to be less than said second amount, and wherein a total amount transferred to said custodial inventory vault for said business day equals a sum of said third amount and said fourth amount; and reporting a transfer of said total amount into said custodial inventory vault after said transfer is completed, wherein said first determining, said subtracting, said second determining, and said reporting are performed by a computer based system.

16. The method of claim 15 wherein said time of said business day is prior to the close of business of the Federal Reserve Bank and wherein said reporting is performed prior to the close of business of the Federal Reserve Bank.

17. The method of claim 15 wherein said predetermined fourth amount is based on a statistical analysis of a plurality of historical ending cash balances of said ten and twenty dollar bills of said institution, wherein each of said plurality of historical ending cash balances corresponds.

18. The method of claim 15 wherein at least a part of the first amount of currency is determined using a processing device configured to automatically detect the amount of ten and twenty dollar bills the depository institution is disbursing throughout the day.

19. The method of claim 15 wherein said predetermined fourth amount is determined by way of performing a statistical analysis of one or more differences, and wherein each of said one or more differences is computed by subtracting said minimum vault holding requirement from each of one or more historical ending balances of ten and twenty dollar bills of said institution of said business day, wherein each of said one or more historical ending balances corresponds to a day of a week of a plurality of weeks, said day corresponding to said business day.

20. The method of claim 15 wherein said method further comprises:

third determining a monetary benefit for said institution based on multiplying said total amount transferred by a benefit rate, wherein said benefit rate is based on holding costs of said ten and twenty dollar bills, wherein said third determining performed by said computer based system.

* * * * *